(12) United States Patent
Numajiri

(10) Patent No.: US 8,240,226 B2
(45) Date of Patent: Aug. 14, 2012

(54) SPEED-VARYING DEVICE AND WIND TURBINE GENERATOR SYSTEM

(75) Inventor: Tomohiro Numajiri, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 24 days.

(21) Appl. No.: 12/513,532

(22) PCT Filed: Mar. 13, 2008

(86) PCT No.: PCT/JP2008/054655
§ 371 (c)(1),
(2), (4) Date: Jul. 31, 2009

(87) PCT Pub. No.: WO2009/113173
PCT Pub. Date: Sep. 17, 2009

(65) Prior Publication Data
US 2011/0006537 A1    Jan. 13, 2011

(51) Int. Cl.
*F16H 3/22* (2006.01)
(52) U.S. Cl. ............................. 74/352; 74/353
(58) Field of Classification Search ............ 74/340, 74/352, 353
See application file for complete search history.

(56) References Cited

U.S. PATENT DOCUMENTS

| | | | | |
|---|---|---|---|---|
| 659,390 | A | * | 10/1900 | Fischer ............................. 74/352 |
| 2,277,614 | A | * | 3/1942 | Suhner ............................. 74/342 |
| 2,516,077 | A | | 7/1950 | Schmitter |
| 2,819,628 | A | * | 1/1958 | Wardlaw .......................... 74/625 |
| 4,315,438 | A | * | 2/1982 | Stephenson ...................... 74/352 |
| 4,887,478 | A | * | 12/1989 | Neuman .......................... 74/354 |
| 6,374,689 | B1 | | 4/2002 | Morrow |
| 2006/0138781 | A1 | | 6/2006 | Miyake et al. |

FOREIGN PATENT DOCUMENTS

| | | |
|---|---|---|
| DE | 10048239 | 10/2001 |
| GB | 1299007 | 12/1972 |
| JP | 4947752 | 5/1974 |
| JP | 56052649 | 5/1981 |
| JP | 08177711 A | 7/1996 |
| JP | 08177711 | 12/1996 |
| JP | 2004-339953 | 12/2004 |

(Continued)

OTHER PUBLICATIONS

International Search Report issued on Apr. 8, 2009.

(Continued)

*Primary Examiner* — Ha D. Ho
(74) *Attorney, Agent, or Firm* — Kanesaka Berner & Partners, LLP

(57) ABSTRACT

A speed-varying device (10A) that can give a high gear ration with a small number of stages and that can be reduced in weight is provided. The speed-varying device (10A) is configured by combining parallel gears, and an input gear (11) provided on an input shaft (Si) and an output gears (12A, 12B) provided on an output shaft (So) are coupled to each other via a plurality of pinion shafts (Sv) that are arranged in the circumferential direction. The pinion shafts (Sv) are each provided with gears (13, 14A to 14D) having teeth different in number at both ends thereof. The gears (14A to 14D) disposed on the output shaft (So) side of the plurality of pinion shafts (Sv) are engaged with the plurality of output gears (12A, 12B) alternately in the circumferential direction. The output gears being arranged so as to be shifted from one another in the axial direction of the output shaft (So).

5 Claims, 7 Drawing Sheets

FOREIGN PATENT DOCUMENTS

JP    2006188953    7/2006

OTHER PUBLICATIONS

Search Report issued on Mar. 29, 2011 for European Patent Application No. 08722059.6.

Office Action issued on May 25, 2011 in corresponding application No. TW097109637.

Office Action issued on Apr. 26, 2011 in corresponding application No. CN200880001149.4.

* cited by examiner

SPEED-VARYING DEVICE AND WIND TURBINE GENERATOR SYSTEM

TECHNICAL FIELD

The present invention relates to a speed-varying device and a wind turbine generator system.

BACKGROUND ART

Wind turbine generator systems generating electricity using wind power, which is natural energy, have been conventionally known. This type of wind turbine generator system includes a rotor head to which wind turbine rotor blades are attached, a main shaft coupled to the rotor head so as to integrally rotate with the rotor head, a speed-increasing gearbox coupled to the main shaft that rotates by means of wind power received by the wind turbine rotor blades, and a generator driven by shaft output power from the speed-increasing gearbox, which are provided in a nacelle mounted atop a tower.

In the thus-configured wind turbine generator system, the rotation of the main shaft and the rotor head provided with the wind turbine rotor blades that convert wind power to rotary power generates shaft output power. The output power of the shaft, whose rotational speed is stepped-up by the speed-increasing gearbox coupled to the main shaft, is transmitted to the generator. Accordingly, in the wind turbine generator system, the shaft output power obtained by converting wind power to rotary power works as the driving source of the generator, and thereby electricity can be generated using wind power as the motive energy of the generator.

The speed-increasing gearbox (speed-varying device) of the above-described wind turbine generator system is, for example, as shown in FIGS. 7 to 9, it is known a structure configured by combining parallel gears in which some pinion shafts (speed-varying shafts) are provided in a speed-varying stage that is provided between an input shaft and an output shaft. In addition, in the speed-increasing gearbox configured by combining spur gears, a reduction in weight is possible by employing a plurality of pinion shafts that are engaged with a gear wheel of a first stage.

In the speed-increasing gearbox 10 shown in the drawings, an input gear (gear wheel) 11 provided on an input shaft Si and an output gear (pinion) 12 provided on an output shaft So are coupled to each other via four pinion shafts Sv that are arranged in the circumferential direction. The pinion shafts Sv are each provided with gears 13 and 14, whose numbers of teeth are different from each other, at both ends.

That is, the pinion shafts Sv of the speed-increasing gearbox 10 are stepped up from the rotational speed of the input shaft Si according to the gear ratio between the input gear 11 and the gear 13 engaged with the input gear 11. Furthermore, the output shaft So of the speed-increasing gearbox 10 is stepped up from the rotational speed of the speed-varying shaft Sv according to the gear ratio between the gear 14 and the output gear 12 engaged with the gear 14 which is coaxial with the gear 13.

Consequently, the speed-increasing gearbox 10 shown in the drawings is a two-stage speed-increasing gearbox including a first stage for stepping-up the speed in which the rotational speed of the input shaft Si is stepped up to the rotational speed of the speed-varying shaft Sv and a second stage for stepping-up the speed in which the rotational speed of the speed-varying shaft Sv is stepped up to the rotational speed of the output shaft So.

In addition, as a speed-increasing gearbox of the above-mentioned wind turbine generator system, for example, there is one in which motive power is distributed into a plurality of power paths using parallel shaft gears in a low speed stage as a first stage, and each output shaft to which the motive power is distributed is coupled to a planetary gear (for example, see Patent Document 1).

Patent Document 1: Japanese Unexamined Patent Application, Publication No. Hei 8-177711

SUMMARY OF THE INVENTION

Recently, wind turbine generator systems have a tendency to become larger with the increase in output. Accordingly, also in order to reduce loads on towers, foundations, and so on, it is required to reduce drive-trains and nacelle structures in weight.

Incidentally, a conventional speed-increasing gearbox 10 constituted by a combination of parallel gears can be decreased in face width and reduced in weight by providing a plurality of pinion shafts Sv for outputting power. However, in the case where the output power of the plurality of pinion shafts Sv returns to one shaft, i.e., the output shaft So of the last stage, when the gears 14 whose number is the same as that of the pinion shafts Sv are arranged in the same line, the speed-increasing ratio, which is the speed increase in one stage, is restricted by the sizes of the gears 14.

The above-mentioned restriction in the speed-increasing ratio will now be specifically described with reference to FIG. 8.

In the example shown in the drawing, four pinion shafts Sv are arranged at a pitch of 90°. In this case, in order to increase the speed-increasing ratio of the output gear 12 that is engaged with the four gears 14 provided on the respective pinion shafts Sv, it is necessary to decrease the number of teeth and the diameter of the output gear 12 and also to increase the numbers of teeth and the diameters of the gears 14. However, since the four gears 14 are arranged in the same line (the same plane), it is necessary to avoid interference between the adjacent gears 14 by arranging the gears so as to secure a suitable clearance L therebetween. Therefore, the speed-increasing ratio that can be set is limited to a value that can secure the minimum clearance L.

In addition, in the above-described speed-increasing gearbox 10, the thrust power cannot be balanced out when a single helical gear is used as the parallel gear. Therefore, it is necessary to provide a thrust bearing on each shaft.

Furthermore, since a casing 15 of the speed-increasing gearbox 10 has a simple planar shape, it is necessary to provide a rib or the like on a planar portion for securing rigidity.

Based on such a background, in the speed-varying device configured by combining parallel gears, it is desired to develop an apparatus that can give a high gear ratio (speed-varying ratio: speed-increasing ratio and speed-reducing ratio) with a small number of stages and that can be reduced in weight. In addition, the speed-varying device becomes from a speed-increasing gearbox to a speed-reducing gearbox or from a speed-reducing gearbox to a speed-increasing gearbox by reversing the input shaft and the output shaft.

The present invention has be accomplished under the above-mentioned circumstances, and it is an object thereof to provide a speed-varying device that can give a high gear ratio with a small number of stages and that can be reduced in weight, and to provide a wind turbine generator system provided with this speed-varying device.

The present invention employs the following solutions for substantially solving the above-mentioned problems.

The speed-varying device of the present invention is a speed-varying device being configured by combining parallel gears and having an input gear provided on an input shaft and an output gear provided on an output shaft that are coupled to each other via a plurality of speed-varying shafts arranged in the circumferential direction, the speed-varying shafts each being provided with gears, whose number of teeth are different from each other, at both ends, wherein the gears on the output shaft side of the plurality of speed-varying shafts are engaged with the plurality of output gears alternately in the circumferential direction, the output gears being arranged so as to be shifted from one another in the axial direction of the output shaft.

According to such a speed-varying device, since the gears on the output shaft side of the plurality of speed-varying shafts are engaged with the plurality of output gears, which are arranged so as to be shifted from one another in the axial direction of the output shaft, alternately in the circumferential direction, interference between the adjacent gears on the output gear side can be prevented, and a high gear ratio can be obtained with a small number of stages.

In addition, since the structure includes the combined parallel gears and the plurality of speed-varying shafts, the speed-varying device can be reduced in weight by decreasing the face widths of the gears.

In the above-mentioned invention, the speed-varying device is preferably provided with an even number of the speed-varying shafts that are arranged in pairs on straight lines passing through the axial center of the output shaft and being orthogonal to each other. By doing so, vibration of the output shaft can be suppressed, resulting in stabilization of the output shaft.

In the above-mentioned invention, it is preferable that the output gear and the gear on the output shaft side of the speed-varying shaft be helical gears, and the numbers of directions of the helical teeth provided on the respective helical gears be the same. By doing so, thrust force acting on each helical gear can be balanced out or reduced.

The wind turbine generator system of the present invention is a wind turbine generator system generating electricity by driving a generator coupled via a drive-train to a rotor head which wind turbine rotor blades are attached thereto and integrally rotate therewith, wherein the drive-train is provided with the speed-varying device.

According to such a wind turbine generator system, since the drive-train is provided with the speed-varying device, the loads on the tower and the nacelle can be reduced due to the speed-varying device that can give a high gear ratio with a small number of stages and that can be reduced in weight.

According to the above-described present invention, it is possible to provide a speed-varying device that can give a high gear ratio with a small number of stages and that can be reduced in weight. Therefore, in the wind turbine generator system provided with the speed-varying device of the present invention, since the speed-increasing gearbox of a drive-train installed on a high position of the tower can be reduced in size and weight, the loads on the tower, the nacelle base plate, and so on can be reduced.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

EXPLANATION OF REFERENCE SIGNS

Figure 1:
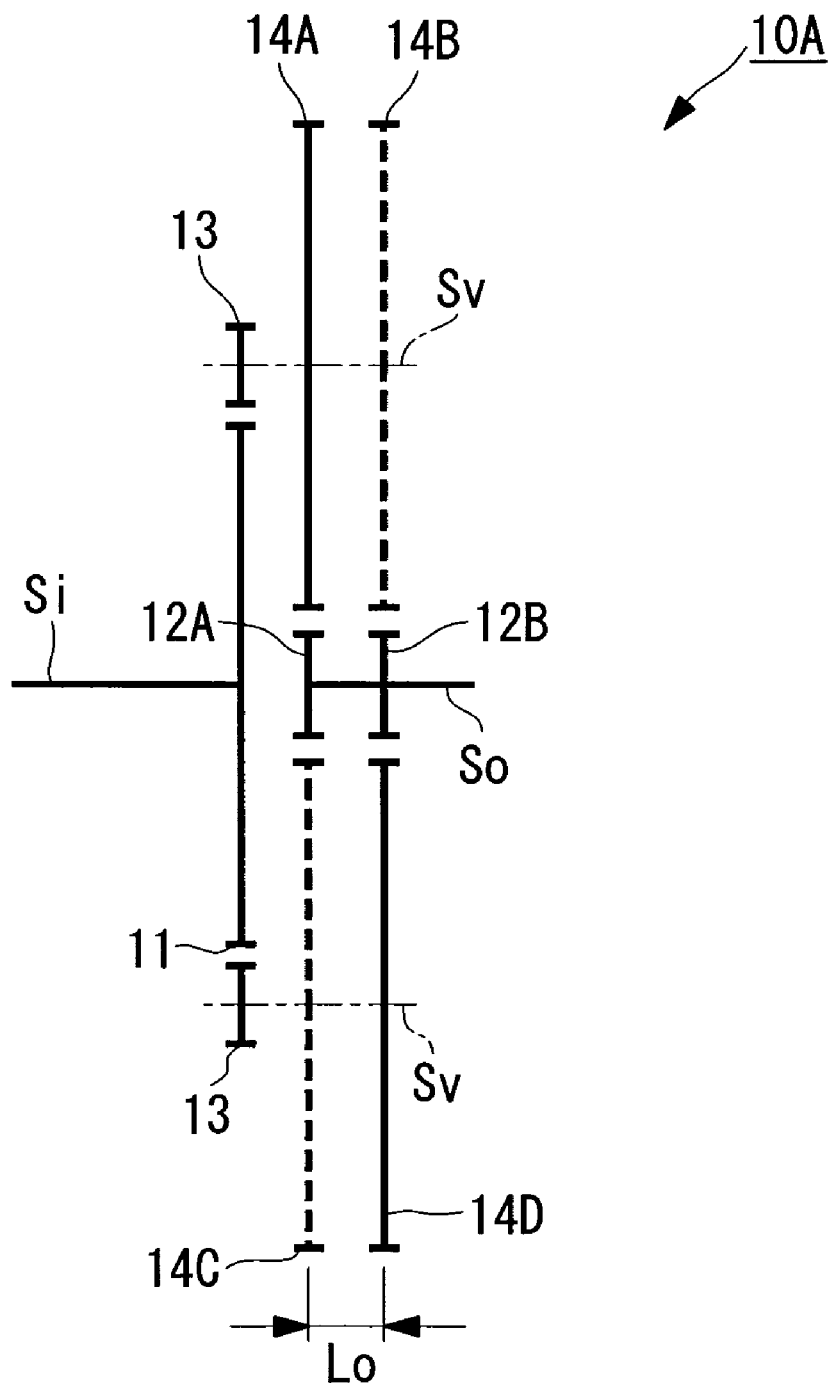
FIG. 1 is a cross-sectional view (taken along the line A-A in FIG. 2) showing a configuration example as an embodiment of a speed-varying device according to the present invention.
Figure 2:
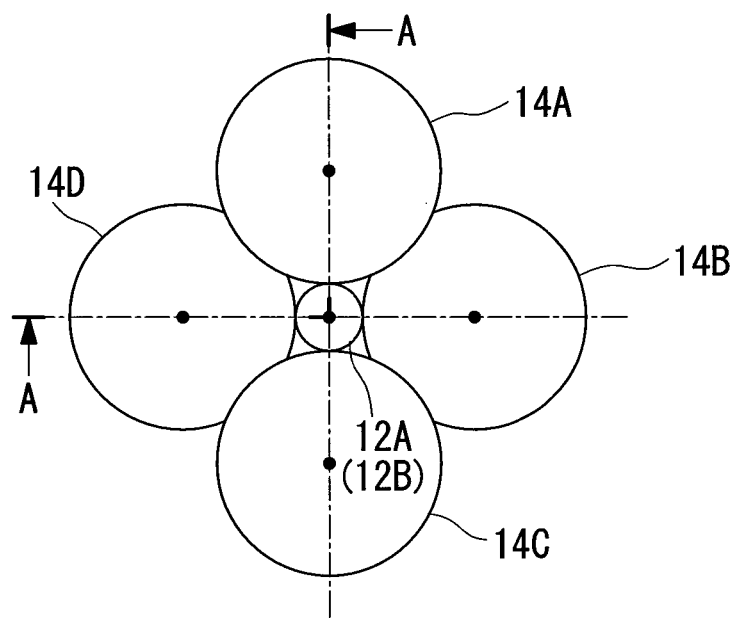
FIG. 2 is a front view of the speed-varying device shown in FIG. 1, viewed from the output shaft side.

1: wind turbine generator system
3: nacelle
4: rotor head 5: wind turbine rotor blade
10A, 10B: speed-increasing gearbox (speed-varying device)
11, 11A: input gear
12A, 12B: output gear
13, 14A to 14D: gear
15A: casing
20: generator
D: drive-train
Si: input shaft
So: output shaft
Sv: pinion shaft (speed-varying shaft)

BEST MODE FOR CARRYING OUT THE INVENTION

An embodiment of a wind turbine generator system according to the present invention will now be described based on the drawings.

Figure 5:
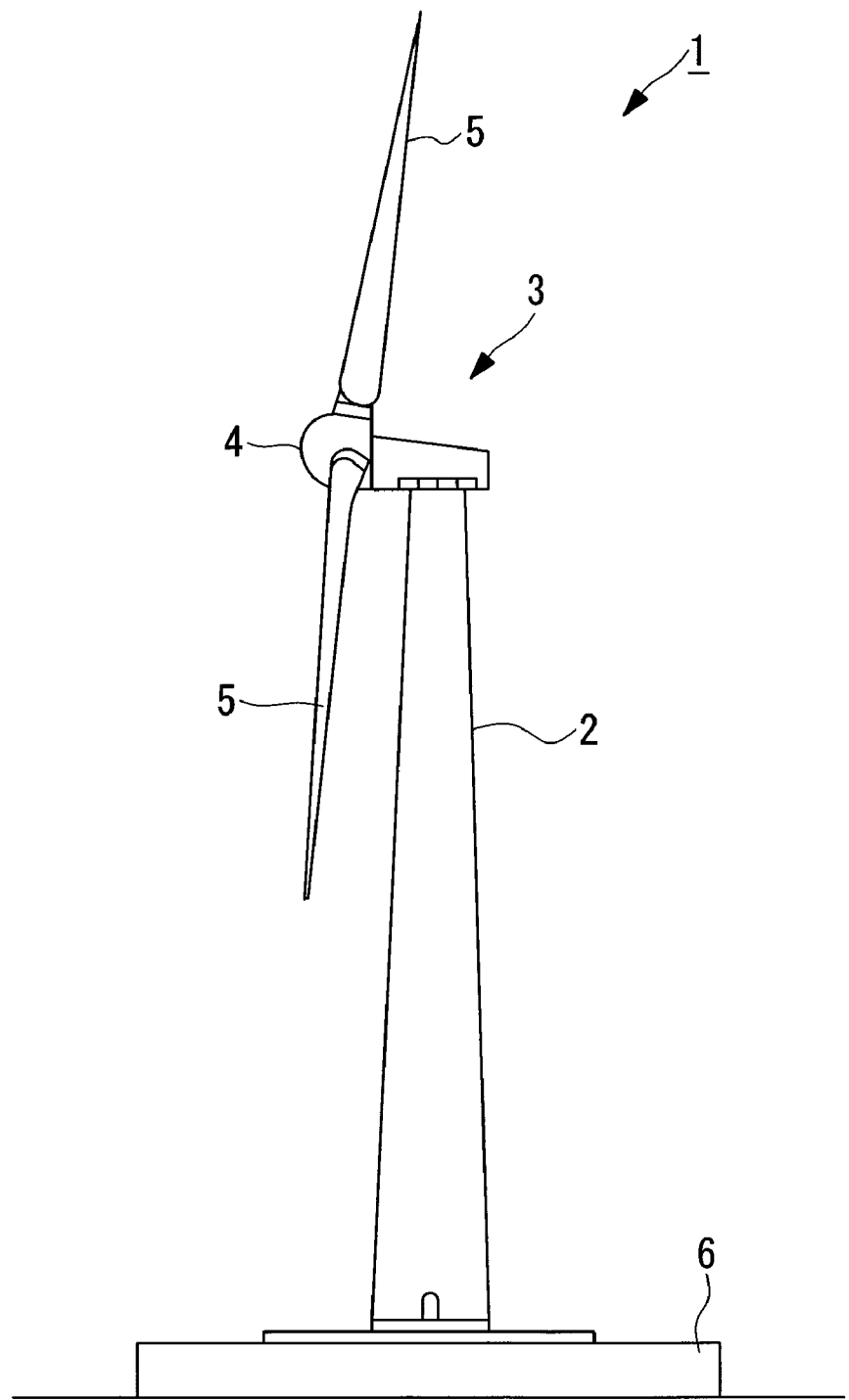
FIG. 5 is a diagram showing an example of the whole configuration of a wind turbine generator system.

The wind turbine generator system 1 shown in FIG. 5 includes a tower 2 vertically installed on a foundation 6, a nacelle 3 mounted atop the tower 2, and a rotor head 4 provided on the nacelle 3 so as to be rotatable around an approximately horizontal axis.

A plurality of wind turbine rotor blades 5 that are arranged radially around the rotation axis thereof are fitted with the rotor head 4. By doing so, the force of wind blowing against the wind turbine rotor blades 5 from the direction of the rotation axis of the rotor head 4 is converted into motive energy causing the rotor head 4 to rotate around the rotation axis. The wind turbine generator system 1 shown in the drawing is called an up-wind type, whose wind turbine rotor blades 5 rotate in front of the nacelle 3.

Figure 6:
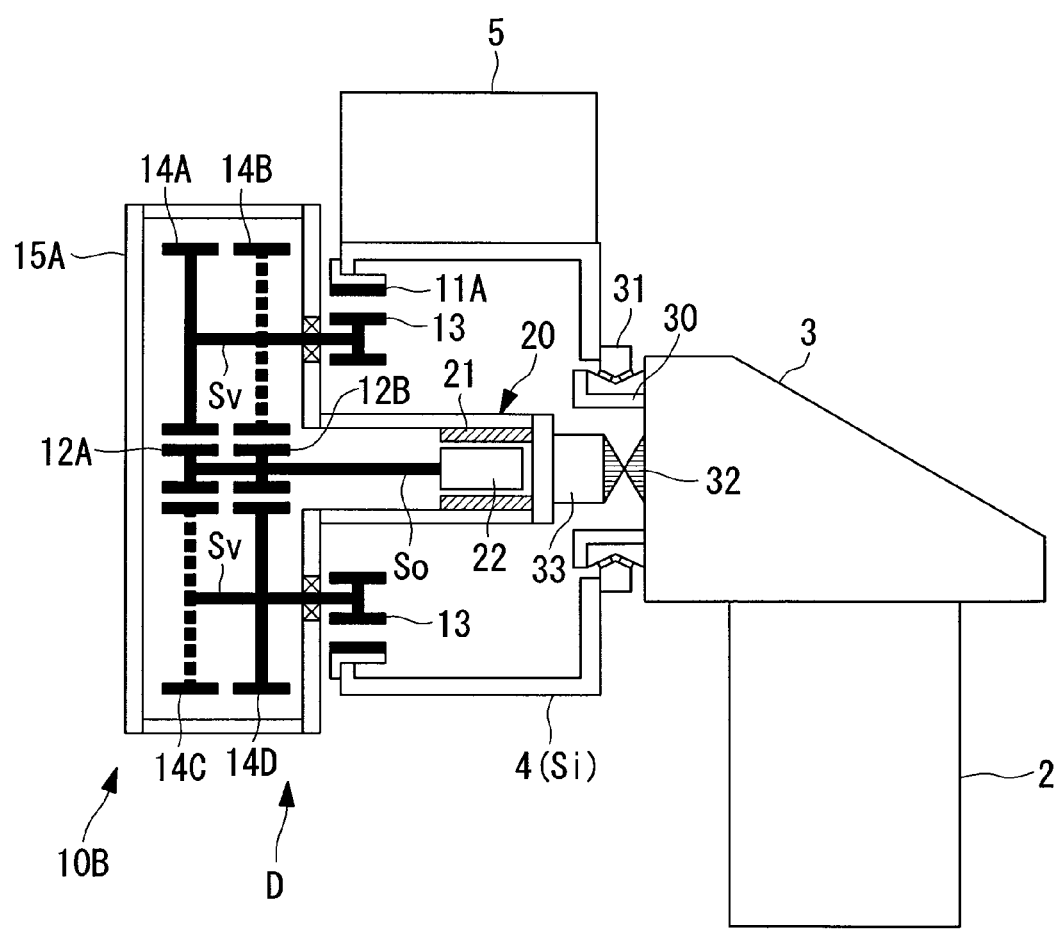
FIG. 6 is a diagram showing a configuration example of a drive-train applied to the wind turbine generator system, as an application example of the speed-varying device shown in FIG. 1.
Figure 7:
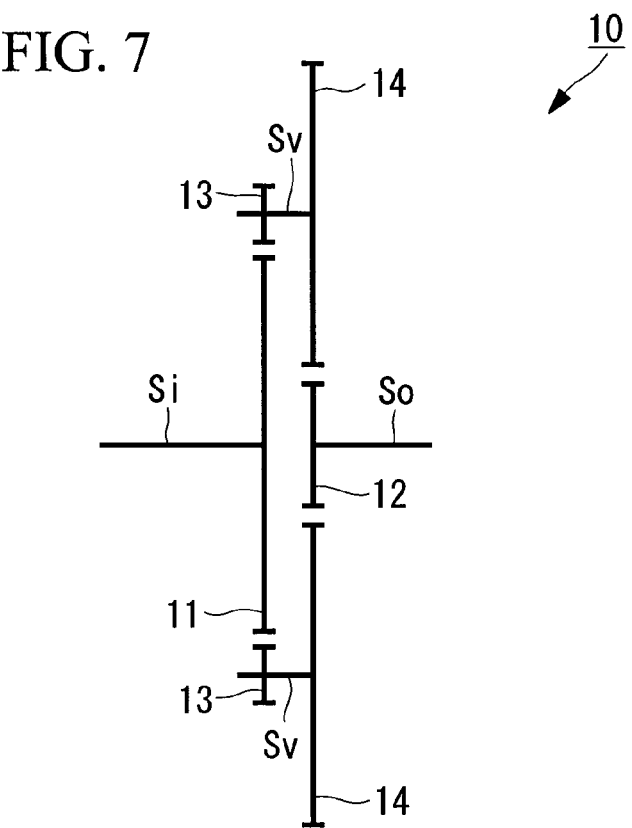
FIG. 7 is a cross-sectional view (taken along the line B-B in FIG. 8) showing an example of conventional speed-varying devices.
Figure 8:
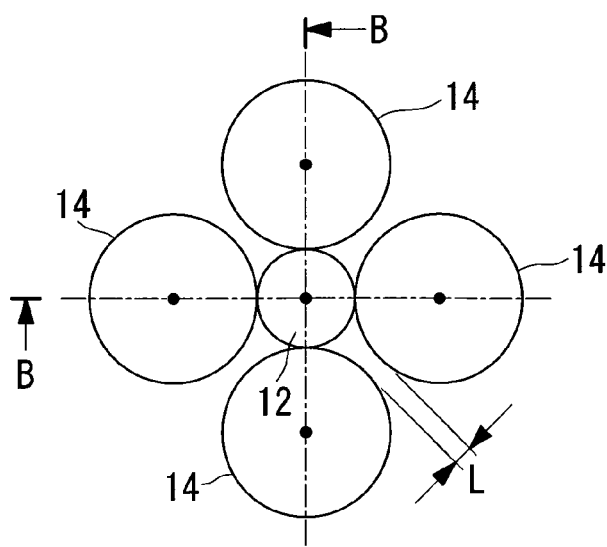
FIG. 8 is a front view of the speed-varying device shown in FIG. 7, viewed from the output shaft side.
Figure 9:
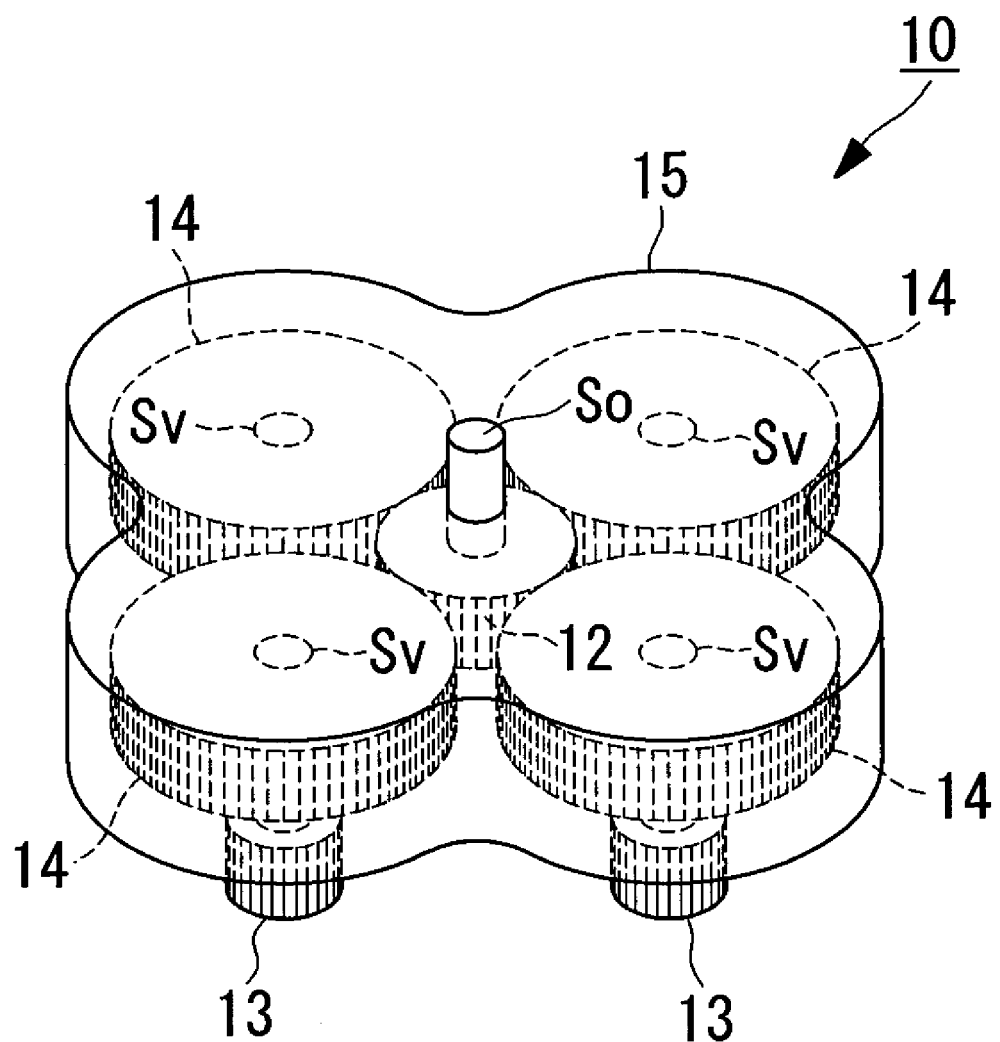
FIG. 9 is a perspective view showing an example of a casing shape of the conventional speed-varying device shown in FIG. 7.

FIG. 6 is an enlarged cross-sectional view of the main portion showing an example of the inner configuration of the rotor head 4 arranged in front of the nacelle 3 and the drive-train D provided in front of and inside the rotor head 4 in a state where a rotor head cover (not shown) is detached. In Embodiments described below, the drive-train D has a structure for transmitting rotation of the rotor head 4 to a generator 20 through a speed-increasing gearbox 10B.

In FIG. 6, the rotor head 4 provided with the wind turbine rotor blades 5 is supported by a main shaft 30 protruding forward from the nacelle 3, through a shaft bearing 31. That is, the rotor head 4 integrally rotates with the wind turbine rotor blades 5 around the main shaft 30, which is fixedly supported by the nacelle 3, by receiving wind with the wind turbine rotor blades 5. In the drawing, reference numeral 32 denotes a flexible coupling, and reference numeral 33 denotes a fixed shaft supporting the drive-train D.

The drive-train D of this Embodiment includes the speed-increasing gearbox 10B that increases the rotational speed of the rotor head 4 and transmits the stepped-up rotation to the generator 20. This drive-train D has a structure in which the generator 20 is arranged on the nacelle side 3 between the nacelle 3 and the speed-increasing gearbox 10B. That is, in the drive-train D shown in the drawing, the generator 20 is arranged on the nacelle 3 side, and the speed-increasing gearbox 10B is arranged at the front end.

In the structure shown in the drawing, the entire generator 20 composed of a stator 21 and a rotor 22 is positioned inside the rotor head 4. As a result, the center of gravity of the drive-train D that is arranged so as to be closer to the rotor head 4 than to the nacelle 3 is brought close to the nacelle 3 side (the shaft bearing 31 side, which is a main bearing) compared to the case where the entire generator 20 is arranged outside the rotor head 4. Consequently, loads such as moments, applied to the tower 2, the nacelle 3, and other parts can be reduced.

Furthermore, in this drive-train D, since the speed-increasing gearbox 10B is positioned at the front end, maintenance and replacement can be performed at the speed-increasing gearbox side, leaving the generator 20 as it is. Therefore, the workability is also superior.

The speed-increasing gearbox 10B is a speed-varying device configured by combining a plurality of parallel gears, and an input gear 11A provided on the rotor head 4 serving as the input shaft Si and output gears 12A and 12B provided on the output shaft So are coupled to each other via a plurality of pinion shafts (speed-varying shafts) Sv that are arranged in the circumferential direction and are each provided with gears 13 and 14, whose numbers of teeth are different from each other, at both ends.

Among the gears 13 and 14 provided at both ends of the plurality of pinion shafts Sv, the gears 14 on the output shaft So side are shifted in the axial direction of the output shaft So and are thereby arranged in an offset manner.

Such a speed-increasing gearbox 10B will be described with reference to FIGS. 1 to 4 below. In the speed-increasing gearbox 10B shown in FIG. 6, the input gears 11A engaged with the gears 13 rotate integrally with the input shaft Si on the outer circumferential side of the gears 13. In the speed-increasing gearbox 10A described below, the input gears 11 engaged with the gears 13 rotate integrally with the input shaft Si on the inner circumferential side of the gears 13. However, the fundamental gear structures are the same.

In the structure example of the speed-increasing gearbox 10A shown in FIGS. 1 to 4, four pinion shafts Sv are arranged at a pitch of 90° in the circumferential direction. Therefore, the numbers of gears 13 and 14 are each the same as the number of pinion shafts Sv: four. In the following description, the gears 14 being located on the output shaft side of the pinion shafts Sv will be referred to with reference numerals 14A to 14D, when differentiation is required.

In the above-mentioned gears 14 on the output shaft So side, among the four gears 14A to 14D, two pairs of gears 14A and 14C and gears 14B and 14D having a positional relationship with a pitch of 180° are arranged so as to be shifted from each other by an offset amount Lo in the axial direction of the output shaft So.

Two output gears 12A and 12B are provided on the output shaft So side such that they are shifted from each other by the same offset amount Lo in the axial direction and are engaged with the above-mentioned two pairs of gears 14A and 14C and gears 14B and 14D, respectively. When this offset amount Lo is set to be larger than the face width of the gears 14, the adjacent gears 14 can overlap with each other in a front view (see FIG. 2).

That is, the four gears 14A to 14D arranged at a pitch of 90° in the circumferential direction are engaged with the two output gears 12A and 12B, which are provided so as to be shifted from each other by the offset amount Lo on the output shaft So, alternately in the circumferential direction. More specifically, the gear 14A is engaged with the output gear 12A, the gear 14B is engaged with the output gear 12B, the gear 14C is engaged with the output gear 12A, and the gear 14D is engaged with the output gear 12B. Therefore, the four gears 14A to 14D are engaged with the two output gears 12A and 12B alternately in the arrangement order in the circumferential direction.

In the thus configured speed-increasing gearbox 10A, since the four gears 14 disposed on the output shaft So side are engaged with the two output gears 12A and 12B, which are provided so as to be shifted from each other in the axial direction of the output shaft So, alternately in the circumferential direction, interference between the adjacent gears on the output shaft side can be prevented, giving a large gear ratio with a small number of stages.

That is, the adjacent gears 14A and 14B are shifted from each other by an offset amount Lo in the axial direction and are thereby not arranged in the same line. Therefore, the adjacent gears 14 do not interfere with one another even if the number of teeth and diameters of the output gears 12A and 12B are reduced and/or the number of teeth and diameters of the gears 14 are increased. As a result, the gear ratio between the gears 14 and the output gears 12A and 12B can be set larger than conventional ratios.

Since the above-mentioned speed-increasing gearbox 10A is configured by combining a plurality of parallel gears and includes a plurality of pinion shafts Sv, the face widths of the gears 11, 12A, 12B, 13, and 14A to 14D can be reduced. Therefore, the reduction in weight thereof can also reduce the weight of the above-mentioned speed-increasing gearbox 10A.

Incidentally, in the above-described Embodiment, the number of pinion shafts Sv provided is four, which is an even number. Consequently, the pinion shafts Sv can be arranged in pairs on straight lines passing through the axial center of the output shaft So and being orthogonal to each other. That is, the above-mentioned arrangement at a pitch of 90° in the circumferential direction is possible, and thereby vibration of the output shaft So can be suppressed, resulting in stabilization of the output shaft So.

Furthermore, the number of pinion shafts Sv in the Embodiment shown in the drawing is four with a pitch of 90°, but may be six or eight.

The number of the above-mentioned pinion shafts Sv may be an odd number. In such a case, vibration of the output shaft So can be relatively stabilized by increasing the number of pinion shafts Sv.

In the above-described speed-increasing gearbox 10A, it is preferable that the output gears 12A and 12B and the gears 14 disposed on the output shaft side of the pinion shafts Sv be helical gears and that the numbers of directions of the helical teeth provided on each helical gear be the same.

Figure 3:
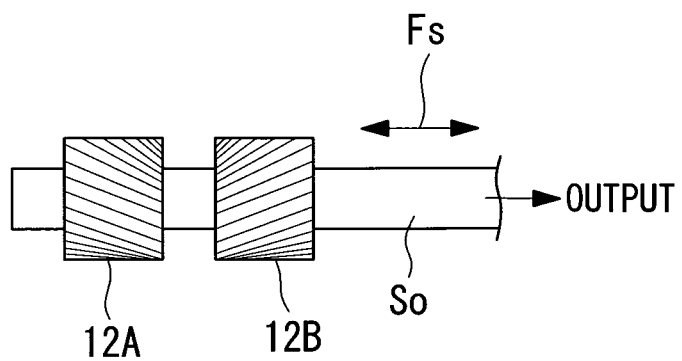
FIG. 3 is a diagram showing an example of the helical teeth direction of an output gear that is provided on the output shaft of the speed-varying device shown in FIG. 1.

More specifically, for example, as shown in FIG. 3, when the helical teeth provided on the two output gears 12A and 12B are in directions opposite to each other, the directions of the helical teeth provided on the gears 14A and 14C and the gears 14B and 14D, which are engaged with the output gears 12A and 12B, respectively, are opposite to each other. Therefore, in the six helical gears, i.e., the output gears 12A and 12B and the gears 14A to 14D, the number of helical teeth in the directions opposite to each other are the same: three.

In such a configuration, the direction of a thrust force Fs acting on the engaging portion of each helical gear becomes the opposite direction according to the direction of the helical teeth. Consequently, the thrust forces Fs acting on the helical gears are balanced out, and the reduction in the thrust force Fs makes it possible to reduce the thrust bearing in size or omit installation thereof, thus promoting a reduction in weight of the speed-increasing gearbox 10A.

Figure 4:
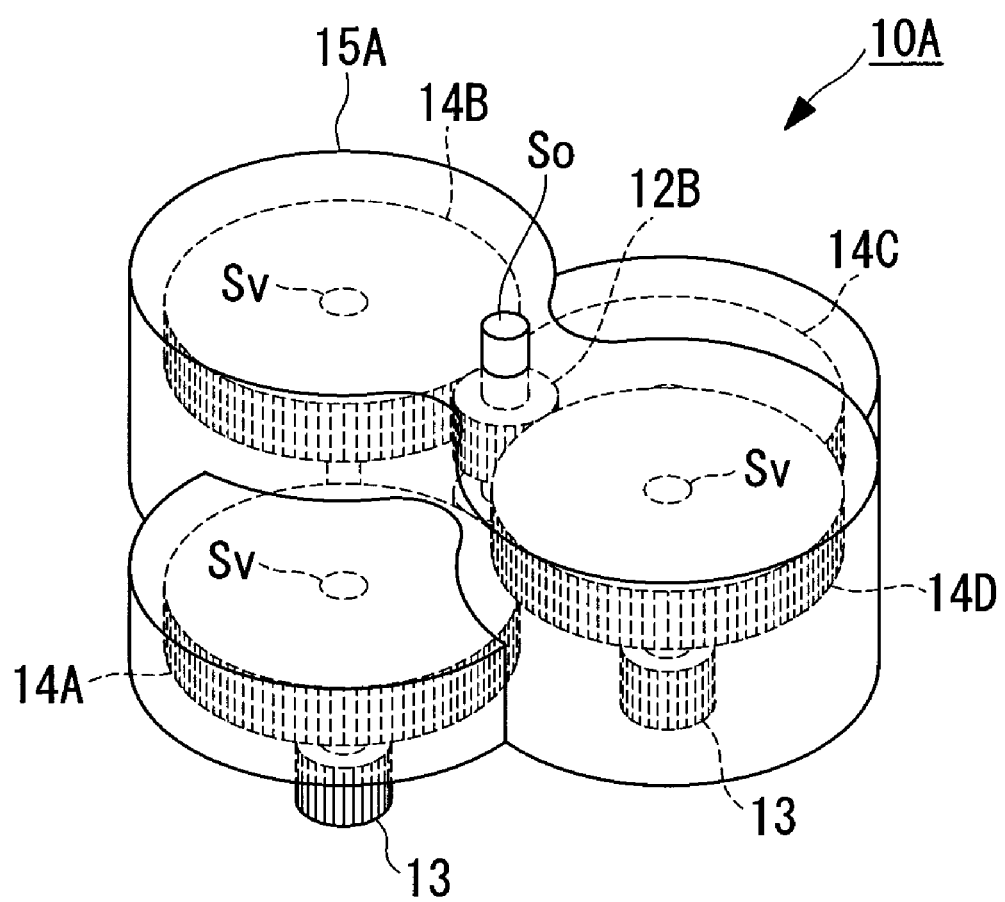
FIG. 4 is a perspective view showing an example of a casing shape of the speed-varying device shown in FIG. 1.

The above-described speed-increasing gearbox 10A, for example, as shown in FIG. 4, has a casing 15A having a shape so as to cover the gears 14, that is, a shape having a difference in level according to the arrangement of the gears 14. As a result, vertical walls are present at the level difference portions of the casing 15A, and these level difference portions improve the rigidity by functioning as a reinforcing structure such as a rib provided on a flat plate.

The area of a flat plate portion continuous therewith is decreased by shaping the casing 15A so as to fit the arrangement of the gears 14, and this also improves the rigidity of the casing 15A.

Accordingly, in the wind turbine generator system 1, which generates electricity by driving the generator 20 coupled via the drive-train D to the rotor head 4 which the wind turbine rotor blades 5 are attached thereto and integrally rotate therewith, the drive-train D is provided with the above-described speed-increasing gearbox 10A and is thereby reduced in weight. Consequently, the loads on the tower 2 and the nacelle 3 can be reduced.

That is, the speed-varying device of the present invention can provide a high gear ratio with a small number of stages and also provide a speed-increasing gearbox 10A that can be reduced in weight. In the wind turbine generator system 1 including the speed-increasing gearbox 10A of the present invention, since the speed-increasing gearbox 10A is reduced in size and weight, the loads on the tower 2, the nacelle base plate, the foundation 6, and other components into which the drive-train D is installed can be reduced.

In the above-described Embodiment, the speed-varying device of the present invention is described as a speed-increasing gearbox 10A that is applied to the drive-train D of a wind turbine generator system 1, but is not limited thereto, and various applications are possible. Furthermore, the speed-varying device of the present invention is not limited to the speed-increasing gearboxes of the above-mentioned Embodiments, and it is possible to use the speed-varying device as a speed-reducing gearbox by reversing the input shaft and the output shaft.

The present invention is not limited to the above-described Embodiments and can be appropriately modified without departing from the gist of the present invention.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A wind turbine generator system generating electricity by driving a generator positioned in a rotor head and coupled via a drive-train to the rotor head which wind turbine rotor blades are attached thereto and integrally rotate therewith, said wind turbine generator system comprising:
   a speed-increasing device provided with the drive-train and arranged at a front end of the rotor head,
   wherein the speed-increasing device includes
      an input shaft, an output shaft and a plurality of speed-increasing shafts arranged in a circumferential direction;
      parallel gears including
         an input gear provided on the input shaft;
         a plurality of output gears provided on the output shaft that are coupled to each other via the plurality of speed-increasing shafts;
         input shaft-side gears arranged at one end of the speed-increasing shafts; and
         output shaft-side gears arranged at the other end of the speed-increasing shafts,
      wherein
         the number of teeth of the input shaft-side gears are different from that of the output shaft-side gears,
         the output shaft-side gears are engaged with the plurality of output gears alternately in the circumferential direction, and
         the output shaft-side gears are arranged so as to be shifted from one another in an axial direction of the output shaft.

2. The wind turbine generator system according to claim 1, wherein an even number of the speed-increasing shafts are arranged in pairs on straight lines passing through an axis center of the output shaft and being orthogonal to each other.

3. The wind turbine generator system according to claim 1, wherein
   the plurality of output gears and the output shaft-side gears are helical gears that include helical teeth, and
   the numbers of the helical teeth in directions opposite to each other are the same.

4. The wind turbine generator system according to claim 2, wherein
   the plurality of output gears and the output shaft-side gears are helical gears that include helical teeth, and
   the numbers of the helical teeth in directions opposite to each other are the same.

5. The wind turbine generator system according to claim 1, wherein the output shaft-side gears overlap each other in the axial direction of the output shaft.

* * * * *